(12) United States Patent
Vohra et al.

(10) Patent No.: US 9,881,303 B2
(45) Date of Patent: Jan. 30, 2018

(54) SYSTEMS AND METHODS FOR IMPLEMENTING AUTOMATIC PAYER AUTHENTICATION

(71) Applicant: PayPal, Inc., San Jose, CA (US)

(72) Inventors: Nikant Vohra, Tamil Nadu (IN);
Priyanshu Agarwal, Tamil Nadu (IN);
Tushar Raibhandare, Tamil Nadu (IN);
Prasanna Annamalai, Tamil Nadu (IN); Anupam Pahuja, Tamil Nadu (IN)

(73) Assignee: PAYPAL, INC., San Jose, CA (US)

( * ) Notice: Subject to any disclaimer, the term of this patent is extended or adjusted under 35 U.S.C. 154(b) by 731 days.

(21) Appl. No.: 14/297,416

(22) Filed: Jun. 5, 2014

(65) Prior Publication Data
US 2015/0356563 A1    Dec. 10, 2015

(51) Int. Cl.
G06Q 20/40 (2012.01)
G06Q 20/20 (2012.01)
G06Q 20/32 (2012.01)

(52) U.S. Cl.
CPC ..... *G06Q 20/40145* (2013.01); *G06Q 20/202* (2013.01); *G06Q 20/3224* (2013.01)

(58) Field of Classification Search
None
See application file for complete search history.

(56) References Cited

U.S. PATENT DOCUMENTS

| 6,587,835 | B1 | 7/2003 | Treyz et al. |
| 6,711,474 | B1 | 3/2004 | Treyz et al. |
| 8,045,961 | B2 | 10/2011 | Ayed et al. |
| 8,090,616 | B2 | 1/2012 | Proctor, Jr. et al. |

(Continued)

FOREIGN PATENT DOCUMENTS

WO    2010109271 A1    9/2010

OTHER PUBLICATIONS

Aisle411 Teams with Estimate on Indoor Retail Mapping, Wireless News, retrieved from http://dialog.proquest.com/professional/docview/1442952412?accountid=1422-57 (Oct. 18, 2013) pp. 1-2.

(Continued)

*Primary Examiner* — Steven Kim
*Assistant Examiner* — Timothy Sax
(74) *Attorney, Agent, or Firm* — Haynes & Boone, LLP

(57) ABSTRACT

A system or method may be provided to facilitate automatic user authentication for electronic transactions. In particular, the system or method may automatically authenticate a customer such that the customer may make complete hands free payments without the intervention of the customer or the merchant. The automatic authentication may include a check-in process and a payment authentication process. When a customer enters a designated area of a merchant, a BLE beacon device of the merchant may automatically check the customer in at the designated area of the merchant. After the customer is checked in at the merchant's designated area, the merchant may identify the customer who is about to make a payment from a plurality of other customers who also are checked in at the merchant via Bluetooth proximity and facial recognition in parallel. Thus, the customer may automatically be authenticated to make payments by facial recognition or Bluetooth proximity.

18 Claims, 4 Drawing Sheets

(56) References Cited

U.S. PATENT DOCUMENTS

| | | |
|---|---|---|
| 8,135,624 B1 | 3/2012 | Ramalingam et al. |
| 8,321,246 B1 | 11/2012 | Shah |
| 8,346,672 B1 | 1/2013 | Weiner et al. |
| 8,438,066 B1 | 5/2013 | Yuen et al. |
| 8,509,734 B1 | 8/2013 | Gupta et al. |
| 8,625,796 B1 | 1/2014 | Ben Ayed |
| 8,682,802 B1 | 3/2014 | Kannanari |
| 8,706,628 B2 | 4/2014 | Phillips |
| 8,856,045 B1 | 10/2014 | Patel et al. |
| D717,309 S | 11/2014 | Govindarajan |
| 8,972,296 B2 | 3/2015 | Govindarajan et al. |
| 9,002,375 B1* | 4/2015 | Lerner ............. H04W 4/02 370/252 |
| 9,002,727 B2 | 4/2015 | Horowitz et al. |
| 9,026,460 B2 | 5/2015 | Grigg et al. |
| 9,131,343 B2 | 9/2015 | Kandekar et al. |
| 9,177,315 B2 | 11/2015 | Pitroda et al. |
| 9,264,151 B1 | 2/2016 | Emigh et al. |
| 9,405,897 B1 | 8/2016 | Bailey et al. |
| 9,419,957 B1* | 8/2016 | Rouse ............. H04L 63/10 |
| 2003/0004743 A1 | 1/2003 | Callegari |
| 2003/0191818 A1 | 10/2003 | Rankin et al. |
| 2004/0019571 A1 | 1/2004 | Hurwitz et al. |
| 2004/0243519 A1 | 12/2004 | Perttila et al. |
| 2007/0125838 A1 | 6/2007 | Law et al. |
| 2007/0235519 A1 | 10/2007 | Jang et al. |
| 2007/0244811 A1 | 10/2007 | Tumminaro |
| 2008/0096579 A1 | 4/2008 | Gill |
| 2008/0262928 A1 | 10/2008 | Michaelis |
| 2008/0280624 A1 | 11/2008 | Wrappe |
| 2009/0327135 A1 | 12/2009 | Nguyen et al. |
| 2010/0030578 A1 | 2/2010 | Siddique et al. |
| 2010/0063867 A1 | 3/2010 | Proctor, Jr. et al. |
| 2010/0082481 A1 | 4/2010 | Lin et al. |
| 2010/0317289 A1 | 12/2010 | Desai et al. |
| 2011/0010291 A1 | 1/2011 | Adams |
| 2011/0016051 A1 | 1/2011 | Trifiletti et al. |
| 2011/0021142 A1 | 1/2011 | Desai et al. |
| 2011/0076941 A1 | 3/2011 | Taveau et al. |
| 2011/0215921 A1 | 9/2011 | Ben Ayed et al. |
| 2012/0050098 A1 | 3/2012 | Kuehnel et al. |
| 2012/0150669 A1 | 6/2012 | Langley et al. |
| 2012/0166332 A1 | 6/2012 | Naaman |
| 2012/0166337 A1 | 6/2012 | Park et al. |
| 2012/0252418 A1 | 10/2012 | Kandekar et al. |
| 2012/0254029 A1 | 10/2012 | Layne et al. |
| 2012/0257561 A1 | 10/2012 | Redding |
| 2012/0258669 A1 | 10/2012 | Honkanen et al. |
| 2012/0265623 A1 | 10/2012 | Zhu et al. |
| 2013/0040574 A1 | 2/2013 | Hillyard |
| 2013/0065584 A1 | 3/2013 | Lyon et al. |
| 2013/0081119 A1 | 3/2013 | Sampas |
| 2013/0099920 A1 | 4/2013 | Song et al. |
| 2013/0103519 A1 | 4/2013 | Kountotsis et al. |
| 2013/0106684 A1 | 5/2013 | Weast et al. |
| 2013/0109323 A1 | 5/2013 | Ruutu et al. |
| 2013/0144701 A1 | 6/2013 | Kulasooriya et al. |
| 2013/0166399 A1 | 6/2013 | Awad |
| 2013/0173466 A1* | 7/2013 | Lepisto ............. G06Q 20/40145 705/44 |
| 2013/0225197 A1 | 8/2013 | McGregor et al. |
| 2013/0251216 A1* | 9/2013 | Smowton ............. H04L 9/3231 382/118 |
| 2013/0252594 A1 | 9/2013 | Faillaci et al. |
| 2013/0260690 A1 | 10/2013 | Cha |
| 2013/0260693 A1 | 10/2013 | Un et al. |
| 2013/0273843 A1 | 10/2013 | Shimota et al. |
| 2013/0273906 A1 | 10/2013 | Cucala et al. |
| 2013/0311798 A1 | 11/2013 | Sultenfuss et al. |
| 2014/0001264 A1 | 1/2014 | Babu et al. |
| 2014/0040120 A1 | 2/2014 | Cho et al. |
| 2014/0108241 A1 | 4/2014 | Tunnell et al. |
| 2014/0113558 A1 | 4/2014 | Varoglu et al. |
| 2014/0114778 A1 | 4/2014 | Miller et al. |
| 2014/0114780 A1 | 4/2014 | Menefee et al. |
| 2014/0122328 A1 | 5/2014 | Grigg |
| 2014/0160978 A1 | 6/2014 | Palin et al. |
| 2014/0172680 A1 | 6/2014 | Prabhu |
| 2014/0172700 A1 | 6/2014 | Teuwen et al. |
| 2014/0188708 A1 | 7/2014 | Govindarajan et al. |
| 2014/0188733 A1* | 7/2014 | Granbery ............. G06Q 20/202 705/64 |
| 2014/0258132 A1 | 9/2014 | Swamy et al. |
| 2015/0041534 A1 | 2/2015 | Rayner et al. |
| 2015/0073980 A1 | 3/2015 | Griffin et al. |
| 2015/0084769 A1 | 3/2015 | Messier et al. |
| 2015/0094080 A1 | 4/2015 | Bleecher et al. |
| 2015/0112826 A1 | 4/2015 | Crutchfield, Jr. |

OTHER PUBLICATIONS

NFC Forum and Bluetooth SIG Publish Developers Guide to Using NFC for BluetoothR] Pairing, Business Wire Retrieved from http://dialog.proquest.com/professional/docview/911923019?accountid=14225-7 . (Dec. 19, 2011) pp. 1-2.

Research and markets: The future of mobile payments 2012, Business Wire, Copyright 2012 Gale, Cengage Learning, (May 16, 2012) pp. 1-5.

* cited by examiner

SYSTEMS AND METHODS FOR IMPLEMENTING AUTOMATIC PAYER AUTHENTICATION

BACKGROUND

Field of the Invention

The present invention generally relates to systems and methods for implementing automatic payer authentication.

Related Art

With the popularity of electronic commerce (e-commerce), many payments are made electronically. In particular, unmanned payment stations, such as payment kiosks, gas pumps at gas stations, toll road payment booths, ticket counters, and the like, at which no personnel is present to accept payments from customers are becoming more common. A customer may use coins, cash, or credit card to make payments at these unmanned payment stations. Typically, the unmanned payment station requires certain authentication from the customer to make payments using credit cards. For example, a customer may need to swipe a credit card and enter certain user ID and/or password to be authenticated. Thus, the authentication process may be cumbersome and inconvenient for the customer.

Figure 1:
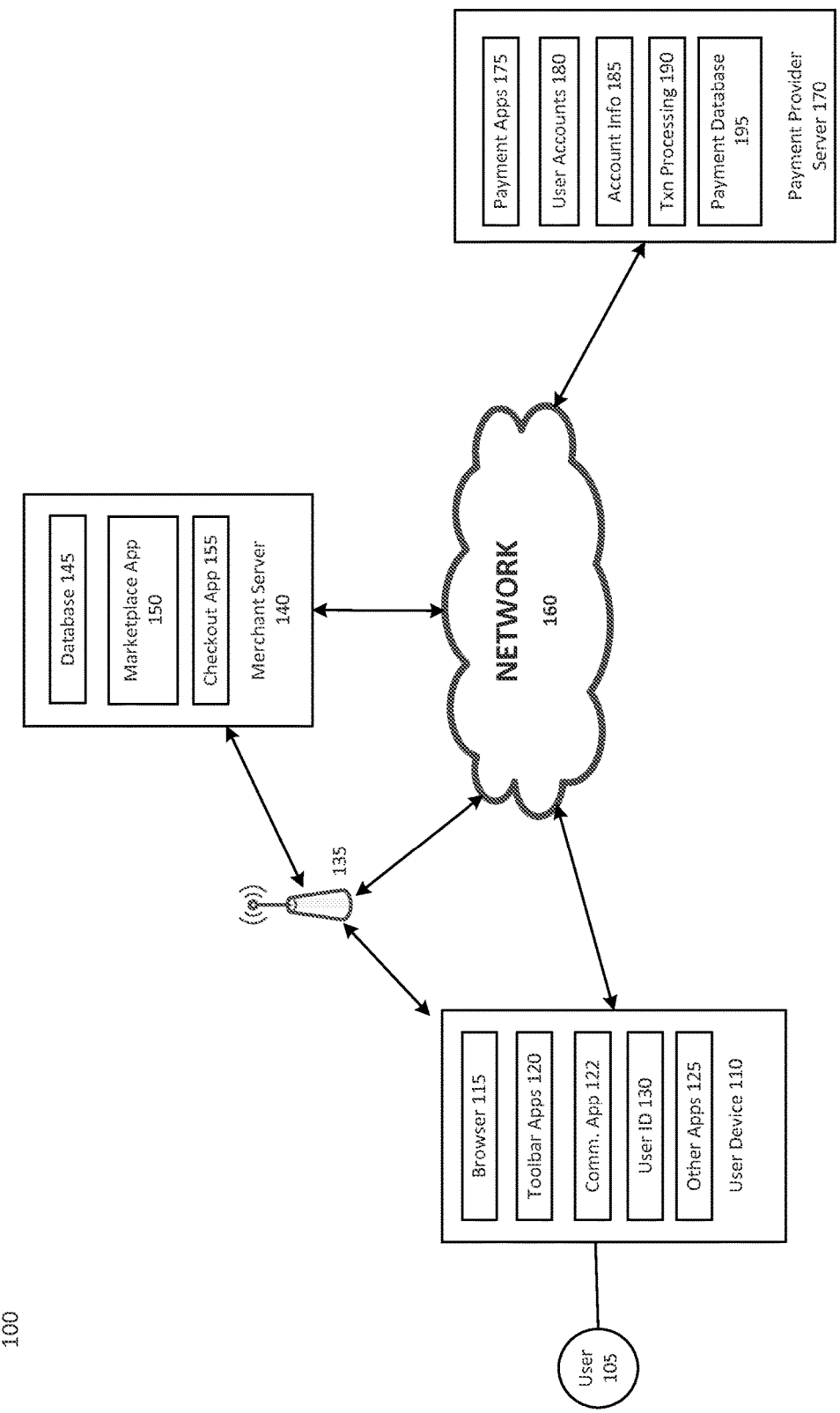
FIG. 1 is block diagram of a networked system suitable for implementing automatic payer authentication according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system or method may be provided to facilitate automatic user authentication for electronic transactions. In particular, the system or method may automatically authenticate a customer such that the customer may make complete hands free payments without the intervention of the customer or the merchant. The automatic authentication may include a check-in process and a payment authentication process.

The check-in process may be implemented when a customer enters a designated area of a merchant. The merchant may detect the customer's presence via Near Field Communication (NFC), such as Bluetooth Low Energy (BLE) communication. For example, a mobile device of the customer may be detected by a BLE beacon. The BLE beacon device of the merchant may automatically check the customer in at the designated area of the merchant when the BLE beacon device of the merchant detects the presence of the mobile device of the customer.

After the customer is properly checked in to the merchant's designated area, the merchant may identify the customer who is currently about to make a payment from among a plurality of other customers who also are checked in at the merchant. However, for unmanned payment stations, the merchant's personnel may not be present to identify the correct customer who is about to make a payment.

In an embodiment, the system or the method may implement Bluetooth proximity and facial recognition in parallel to correctly identify the customer who is about to make a payment. For example, the merchant's system may be integrated with a processor, such as a raspberry pi or an arduino board. The processor may be connected to a camera, such as a web cam, and a BLE device. When a customer is standing at the unmanned payment station at the merchant, the customer may be identified from among all the checked in customers by facial recognition. Because the system is not trying to identify the customer from the general population but from a set number of checked-in customers, the system may perform the facial recognition with relative ease. Further, by limiting the number of possible matches to the set of checked-in customers, the system may have a quick response time in the facial recognition process and the network bandwidth consumption for implementing facial recognition process between the merchant, the beacon, and the payment service provider may be reduced.

When a customer is checked in at the merchant location, the facial recognition service at the payment service provider may get trained on the fly for the set of checked in customers at the merchant location. When a customer walks up to the unmanned payment station of the merchant, the camera may capture the customer's image and may send the image to the payment provider server. The facial recognition service at the payment service provider may analyze the image to identify the customer from among the checked-in customers, e.g., by comparing the image against the trained dataset of facial images or features. Once the customer is identified, the identification or name of the customer may be notified to the merchant along with a confidence value indicating how closely matching the image is to the identified customer.

In an embodiment, because the facial recognition may not be 100% accurate in identifying the customer in some cases, Bluetooth proximity may be used to improve accuracy in the identification. The processor at the merchant may keep track of the Received Signal Strength Indications (RSSI) of the Bluetooth signals received from various mobile devices of the checked-in customers. The RSSI's may indicate the distances of the respective mobile devices from the unmanned payment station or from the merchant's BLE device. Thus, the RSSI values may be used to determine whether the customer identified by facial recognition is also the customer who is standing at the unmanned payment station. If the RSSI value and the confidence value are greater than a particular threshold, the system may confirm and authenticate the identified customer for payment. Other techniques, such as voice recognition or other biometric sensors may be used to identify the customer.

FIG. 1 is a block diagram of a networked system 100 configured to implement a process for implementing automatic payer authentication in accordance with an embodiment of the invention. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant server 140, a wireless beacon 135, and a payment provider server 170 in communication over a network 160. Payment provider server 170 may be maintained by a payment service provider, such as PayPal, Inc. of San Jose, Calif. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, wireless beacon 135, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, wearable device, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a smart wallet through the payment provider as discussed above.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may install and execute a payment application received from the payment service provider to facilitate payment processes. The payment application may allow user to send payment transaction requests to the payment service provider. In particular, the payment application may authenticate user 105 before making payments. In an embodiment, the payment application may implement automatic authentication of the user 105 when the user 105 is at certain payment locations.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be a donation to charity. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, user names, phone numbers, credit card information, bank information, or other financial information which may be used to facilitate online transactions by user 105. Account information may also include user purchase history and user ratings. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

In one embodiment, payment provider server 170 may receive information related to automatic authentication of the user 105. For example, a facial profile of the user 105 may be generated based on the user 105's facial features to allow facial recognition of the user 105 for automatic authentication. The user 105's account at the payment provider server 170 also may include settings and information of user 105's user device 110 and information for implementing checking in of the user device 110 at POS locations of various merchants. Merchant accounts at the payment provider server 170 also may store registration information of wireless beacons of various merchants at various POS locations.

Wireless beacon 135 may be operated by the merchant or the payment service provider. Wireless beacon 135 may broadcast wireless signals, such as Bluetooth Low Energy (BLE) signals or WiFi signals to nearby user devices. Wireless beacon 135 may be provided at a merchant's store or at other Point Of Sale (POS) locations to implement checking in of user devices. When the user device 110 detects the wireless signals from wireless beacon 135. User device 110 may begin a checking in process to check the user device 110 into the merchant's store or POS location. By checking in, the user device 110 may be pre-authenticated or pre-authorized to perform various transactions with the merchant.

Figure 2:
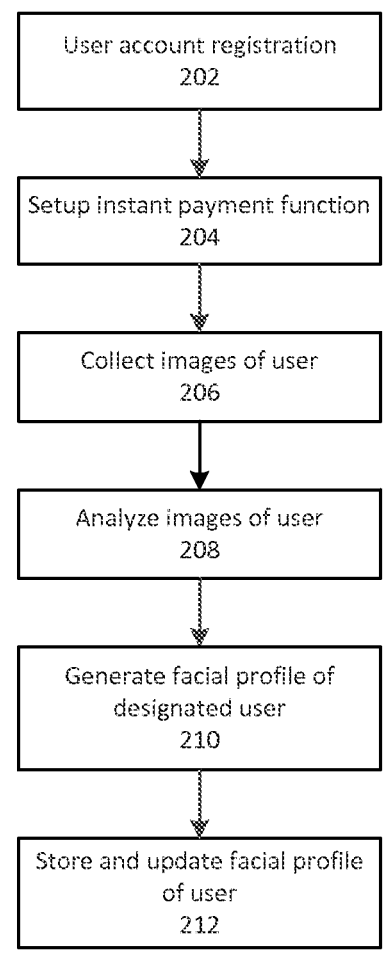
FIG. 2 is a flowchart showing a process for setting up automatic payer authentication function according to one embodiment.

FIG. 2 is a flowchart showing a process 200 for setting up automatic payer authentication function according to one embodiment. At step 202, payment provider server 170 may receive user 105's account registration. In particular, user 105 may set up a payment account at the payment service provider to make and receive payments. User 105 may set up funding sources, such as credit card accounts, bank accounts, and the like, to fund the payment account. User 105 also may provide various personal information for additional security checks. For example, user 105 may set up a login ID and a password for accessing the payment account. As such, user 105 may be authenticated when making a payment using the payment account by entering user 105's ID and password. Other authentication methods, such as finger print scanning, voice recognition techniques, or facial recognition techniques, also may be utilized for authentication.

At step 204, an automatic payer authentication function may be set up for user 105's payment account. For example, payment provider server 170 may inquire user 105 whether user 105 wants to utilize the automatic payer authentication function to automatically authenticate the user 105 when making payments without the user 105 having to implement the authentication process, e.g., without entering user ID and password. User 105 may agree to or deny the automatic payer authentication function in the payment application. At step 206, if user 105 agrees to use the instant payment function, payment provider server 170 may collect images of the user 105. The user 105 may provide or select a facial image or picture of the user 105 from user's digital photo album, contact list, social network account, and the like. The user 105 may select or provide multiple images or pictures of user 105's facial images. For example, with the user 105's permission, the user 105's social network accounts, contact lists, digital photo albums, and the like may be accessed to find pictures of the user 105. These pictures may previously be tagged by user 105 or others to identify the user 105 included in the pictures. Thus, pictures of the user 105 may be identified and collected. The user 105 also may use a camera included with user device 110 to capture a picture of the user 105, e.g., a selfie. In some embodiments, other biometric information of the user 105, such as the user's voice, the user's finger print, and the like, may be used for authenticating the user 105. As such, the user 105 may provide or submit other biometric information to payment provider serve 170. In an embodiment, the user 105 also may select or designate a funding source, such as a credit card account, that is to be used to make payments for the automatic authenticated transactions. The user 105 also may select the type of locations or merchants where the automatic authentication may be implemented, such as a toll booth, a retail location, an ATM, a payment kiosk, and the like.

At step 208, the user device 110 or the payment provider server 170 may analyze the images or pictures of the user 105. In particular, facial recognition algorithms may be used to perform image analysis to identify facial features or landmarks of the facial images. The relative position, size, and/or shape of the eyes, nose, cheekbones, jaw and the like may be analyzed. The skin texture of the payees also may be analyzed. At step 210, a facial profile may be generated for the user 105. The facial profile may indicate features or landmarks that distinguish a face of the user 105 from the others. The facial profile of the user 105 may be continuously improved as more images or pictures of the user 105 become available for analysis. Thus, the system may continue to improve the facial profile of each payee to improve the accuracy of facial recognition.

At step 212, the facial profiles of the user 105 may be stored and continuously updated. For example, when more pictures or images of the user 105 are identified on the social network or are submitted by the user 105, the facial profile of the user 105 may continuously be updated to improve facial recognition of the user 105. In an embodiment, the facial profile of the user 105 may be improved by information and images provided from the user 105. The facial profile of the user 105 also may be improved by information and images provided from other users. Thus, the facial profile of the user 105 may be improved by crowd sourcing. In an embodiment, the facial profile of the user 105 may evolve over time as the look of a person may change over time. As such, pictures or information that are older than a certain time limit may no longer be incorporated in the facial profile of the user 105 to ensure that only most recent pictures or information are used for the facial profile.

By using the above process 200, a facial profile may be set up for each user of payment accounts for performing facial recognition. In particular, the system may collect pictures or images from the user 105's contact list, digital photo albums, social network accounts, photo accounts, and the like. The user 105 also may submit pictures of the user 105 by taking pictures of the user 105 using a camera. The collected pictures or images may be used to set up and improve the facial profiles.

Figure 3:
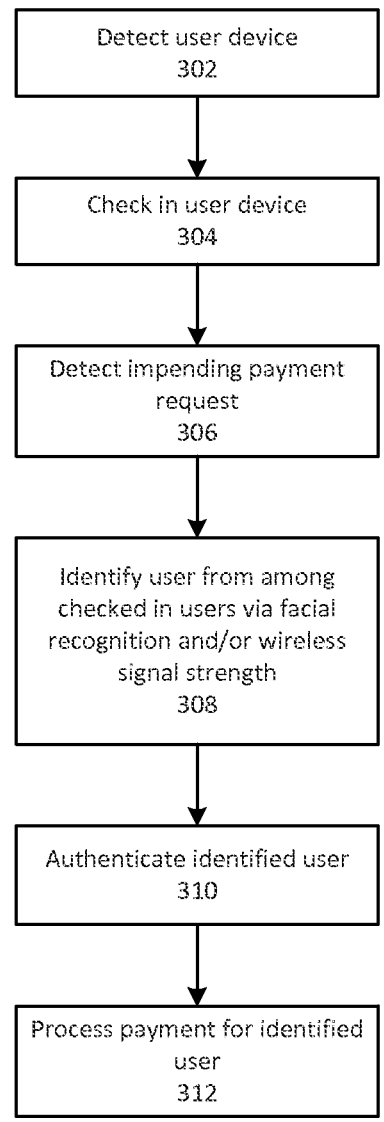
FIG. 3 is a flowchart showing a process for implementing automatic payer authentication according to one embodiment.

FIG. 3 is a flowchart showing a process for implementing instant payments according to one embodiment. Initially, the user device 110 may be registered with the payment provider server 170. For example, the registration process may include signing up the user device 110 to the payment service provider, such as PayPal. This may involve installing a payment application on the user device 110, registering the user 105, and initializing the application with the registered user. At this point, the user device 110 may then be given a set of advance one-time use payment tokens and associated keys. In some embodiments, the associated keys may include a pair of symmetric keys. These user tokens may each have, for example, a user identifier, a token value, a key serial number and an AES or other crypto key, as will be readily appreciated by one of skill in the art. Such user tokens may be assigned by the payment provider server 170. Records of these assigned keys and user tokens are stored on database(s) at the payment provider server 170, such that it may be known to the payment service provider who such a token belongs to when it is put into use.

The wireless beacon 135 may also be registered with the payment provider server 170. For example, the wireless beacon 135 may be supplied with a digital signatures and one-time use tokens. Each check-in and possible purchase or other transaction may then be tracked using a one-time token from both the user device 110 and a merchant beacon or beacon system that checks in the user device 110. As in the case of the user device 110 above, the keys and tokens for the beacon may also be assigned by and stored at the payment provider server 170 for later reference. After registration, the user device 110 and the wireless beacon 135 may now be ready for communications, check-ins and transactions.

The automatic authentication may include a check-in process and a payment authentication process. The check-in process may be implemented when a customer enters a designated area of a merchant. The merchant may detect the customer's presence via Near Field Communication (NFC), such as Bluetooth Low Energy (BLE) communication. For example, the user device 110 of the user 105 may be detected by the wireless beacon 135. The wireless beacon 135 of the merchant may automatically check the user device 110 in at the designated area of the merchant when the wireless beacon 135 of the merchant detects the presence of the user device 110 of the user 105.

At step 302, the user device 110 may be detected. For example, a generic UUID may constantly be broadcasted from the wireless beacon 135. When the user device 110 enters the wireless broadcast range of the wireless beacon 135, this UUID is detected and verified as issued by the same payment service provider. The user device 110 and the wireless beacon 135 may then initiate communications.

At step 304, the user device 110 may then be automatically checked into the location of the merchant via the wireless beacon 135. For example, metadata about the location, a specific one-time use beacon token, and a digital signature may be sent from the wireless beacon 135 to the user device 110. The user device 110 may then certify the beacon token and verify the digital signature as being issued by the same payment service provider by using a public key previously provided from the payment service provider during registration. Assuming that the beacon token sent over is authentic, the user device 110 then may select one of its assigned one-time use user tokens.

The user device 110 then may encrypt both its user token value and the beacon token value together using the key associated with the user token, and then send this encrypted value back to the wireless beacon 135. Again, all of these communications between the user device 110 and the wireless beacon 135 may be on an unencrypted channel, as any other outside device that might be listening or noting these open communications will not know what to make of the token values without any reference table that knows where those tokens were assigned. In fact, the wireless beacon 135 may not know what to make of the combined encrypted value. Rather, the wireless beacon 135 may simply forward this value on a back channel to the payment provider server 170. The payment provider server 170 knows what to do with these values, since it has the details of where and to whom all tokens were assigned in various tables or other storage mechanisms on its database(s).

The payment provider server 170 may decrypt the combined encrypted value and verify the authenticity and ownership of both the user token and the beacon token. The payment provider server 170 may then approve of the user device 110 and provide affirmative check-in instructions back to the wireless beacon 135. It is worth noting that while the communications between the user device 110 and the wireless beacon 135 over BLE may be unencrypted, the communications between the wireless beacon 135 and the payment provider server 170 may be on a separate more protected channel. Neither the user device 110 nor any other device need to see these communications between wireless beacon 135 and the payment provider server 170 of the payment service provider. As the user device 110 is then checked in and the one time use tokens for the user device 110 and wireless beacon 135 are both committed to this checkin and any resulting transaction, one or more new tokens may then be optionally provided to the user device 110 and/or the wireless beacon 135. The payment provider server 170 then may mark both of these tokens as used on its databases, whereupon the "handshake" checkin process or method then may be completed.

In various embodiments, many respective one-time use tokens may be stored on each of the various user devices and/or wireless beacons at any given time. Selection of a given token from the pool of possible tokens may be random, which adds some layer of protection from potential fraud or misuse. Further, the requirements that each token be used one time only, and that the combined encrypted token values be verified by the payment service provider may prevent or reduce the possibility of token replay or bit fiddling by unscrupulous persons who might otherwise try to make something of the unencrypted and open communications over BLE channels. Again, these tokens may be replenished one at a time as they are used and discarded or otherwise rendered unusable, such as by part of a check in process. Alternatively, or in addition, each user device and/or wireless beacon may also request more tokens from the payment provider server 170 independently as needed.

Other safety mechanisms to provide better security may include expiration dates on each token, as well as a requirement that the user device 110 be in constant communication with one or more wireless beacons at the merchant from checkin through any checkout and purchase or other transaction. In the event that communications are lost or dropped, then a new checkin with new tokens may be required if desired for security purposes. Further, it is also worth noting that the third party user device does not need to access the private keys of any beacon. Rather, the public keys may be adequate for the payment provider server 170 to verify and authenticate tokens for both the user device 110 and the wireless beacon 135 for checkin and later transaction. In some embodiments, there may be only one pair of public and private keys for all beacons at all merchants, with the private key being on the payment provider server 170, and the public key being provided to the user device 110.

After the user device 110 is checked in at the merchant's location (POS) via the wireless beacon 135, the payment provider server 170 or the merchant device 140 may detect any impending payment request or transaction at step 306. Impending payment or transaction may be detected by various methods based on the type of transactions or POS. For example, the impending payment request or transaction may be detected by the user 105 operating a vending machine, a kiosk, a payment terminal, a toll machine, an Automatic Teller Machine (ATM), a payment device at a checkout counter, or the like. As such, the impending payment request or transaction may be detected when the user 105 is operating some kind of device at the merchant's POS to select merchandise or to begin a payment processing. In an embodiment, the impending payment request for transaction may be detected when the user 105 approaches a device or an area of the merchant's POS where payment or transaction may be implemented. For example, when the user 105 walks up to a checkout counter or when the user 105 approaches a payment kiosk, the impending payment request or transaction may be detected.

If impending transaction or payment is detected indicating that a user is about to make a payment or a transaction, the payment provider server 170 may identify the user who is about to make the payment or the transaction. In particular, a plurality of users may be checked in at the merchant's POS at the same time. Thus, the payment provider server 170 may determine which one of the plurality of checked-in users is the person who is about to make a payment or a transaction.

For unmanned payment stations, the merchant does not have personnel present to identify the correct customer who is about to make a payment. Thus, the payment provider server 170 may implement facial recognition to correctly identify the user who is about to make a payment. For example, the merchant's system may be integrated with a processor, such as a raspberry pi or an arduino board. The processor may be connected to a camera, such as a web cam, and a BLE device. When a user is standing at the unmanned payment station at the merchant, the user may be identified from among all the checked in users by facial recognition. Because the system is not trying to identify the user from a large number of people of the general population, but from a set number of checked-in users, the system may perform the facial recognition with relative ease.

When the user 105 is checked in at the merchant location, the facial recognition service at the payment service provider may get trained on the fly for the set of checked in users at the merchant location. When a user walks up to the unmanned payment station of the merchant, the camera may capture the user's image and may sent the image to the payment provider server 170. The facial recognition service at the payment service provider may analyze the image to identify the user at the unmanned payment station from among the checked-in users, e.g., by comparing the image against the trained dataset of facial images or features. Once the user at the unmanned payment station is identified, the identification or name of the user may be notified to the merchant along with a confidence value indicating how closely matching the image is to the identified user.

In an embodiment, the payment provider server 170 may determine whether the image of the user captured at the unmanned payment station matches any of the facial profiles of the checked-in users. For example, a predetermined confidence score may be set below which the facial profile of a checked-in user may be considered non-matching. If none of the facial profiles of the checked-in users has a confidence score above the predetermined confidence score, it may be determined that none of the facial profiles of the checked-in users matches the image of the user captured at the unmanned payment station. If no match is found, the user at the unmanned payment station may be required to enter additional information to be authenticated. As such, automatic authentication is not available when the user at the unmanned payment station cannot be identified. For example, the user at the unmanned payment station may not be registered to use the automatic authentication feature. Thus, the user may be required to go through the regular authentication process of swiping a credit card and entering additional information, such as user ID and/or password.

If the image of the user captured at the unmanned payment station matches one of the facial profiles of the checked-in users, the payment provider server 170 may automatically authenticate the identified user for immediate payment transaction at step 310. The regular authentication process of swiping a credit card and/or entering password may be omitted. In particular, the payment provider server 170 may simply determine the transaction amount based on the merchandize and/or service selected by the user and automatically process the payment for the selected merchandize and/or service at step 312. For example, payment service provider may debit a payment amount from the user 105's account and may credit the payment amount to the merchant's account. Accordingly, the user 105 may make a payment to a merchant without swiping a credit card or entering additional information at an unmanned payment station, such as a payment kiosk, a vending machine, a toll machine, an automatic check-out counter, an ATM, and the like.

In an embodiment, the automatic authentication feature also may be implemented at a manned payment station to speed up the payment process. For example, at a checkout counter where a cashier person is taking payments, the automatic authentication feature may be implemented to speed up the payment process for the user and the cashier person. For example, the user 105 may automatically be checked in and authenticated by facial recognition and/or wireless signal strength, such that the cashier person does not require the user 105 to swipe a credit card or enter any information for making a payment. If the user 105 is automatically checked in and authenticated, the cashier person may be notified that the user 105 has already been checked in and authenticated and that the cashier person may go ahead and process the payment without requesting the user 105 to swipe a credit card or enter any additional information.

In an embodiment, multiple checked-in users may be identified at the unmanned payment station. In this case, the multiple checked-in users may be identified to the user or users at the unmanned payment station. The user or the users may then determine how transactions or payments should be made. For example, one of the multiple identified users may pay for the entire transaction. In another example, the payment may be distributed evenly or in various ways among the multiple identified users. This may allow a group of checked-in users to decide how a payment should be made as a group, such as at a restaurant or at a group activity.

Because the facial recognition may not be 100% accurate in identifying the user in some cases, Bluetooth proximity may be used to improve accuracy in the identification. The processor at the merchant may keep track of the Received Signal Strength Indications (RSSI) of the Bluetooth signals received from various mobile devices of the checked-in users. The RSSI's may indicate the distances of the respective user devices from the unmanned payment station or from the merchant's BLE device. Thus, the RSSI values may be used to determine whether the user identified by facial recognition also is the same user who is standing at the unmanned payment station. If the RSSI value and the confidence value are greater than a particular threshold, the system may confirm and authenticate the identified customer for payment.

In an embodiment, the Bluetooth proximity may be used to speed up the facial recognition process. For example, the facial recognition process may match the facial image captured at the payment station with the user located closest to the payment station first. If the facial image matches with the user located closest to the payment station, there is no need to continue comparing and matching the facial image captured at the payment station with other users located further from the payment station, because the user located closest to the payment station is very likely the person whose facial image is captured at the payment station. Thus, the facial recognition process may perform the facial image matching based on the distance the users are located from the payment station. This may speed up the facial recognition process.

In an embodiment, two or more wireless beacons may be used to detect the position of the user devices checked in at the merchant. For example, two BLE beacons may be mounted at two different positions separated by a predetermined distance at the unmanned payment station. When a user device is detected, the Time Difference of Arrival (TDA) of the wireless signal emitted from the user device and received at the two BLE beacons may be determined. By calculating the difference in time it took for the wireless signal of the user device to arrive at the two BLE beacons, the position of the user device may be determined. As such, the system may determine which user device is positioned at the unmanned payment station to authenticate the user of the user device.

In an embodiment, the wireless signals emitted from the user device and received at two different BLE beacons may be used to determine the Angle of Arrival (AOA) of the wireless signal. The AOA may then be used to determine the position of the user and to authenticate the user. In some embodiment, the AOA and the TDA of the wireless signal received from the user device at two or more different BLE beacons may be used in combination to determine the position of the user device and the user. Thus, by using two more of BLE beacons, the position of the user device and the user with respect to the payment station may be determined with accuracy.

In the above processes, the steps are executed at payment provider server 170. In one embodiment, the steps may be executed at user device 110, at merchant server 140, or at wireless beacon 135. In still another embodiment, the steps may be executed among payment provider server 170, user device 110, wireless beacon 135, and merchant server 140 in coordination with each other. In the above embodiment, facial recognition is used to identify the customer. Other techniques, such as voice recognition or other biometric sensors may be used to identify the customer.

The following is an example of the implementation of the processes 200 and 300:

A vending machine may be equipped with a camera configured to take pictures of a customer standing in front of the vending machine and a BLE beacon configured to communicate and check in user devices that are in proximity to the vending machine. When a customer walks up to the vending machine, the customer may automatically be checked in by the BLE beacon. Further, the vending machine may take a picture of the customer. The picture of the customer and the proximity of the customer to the vending machine both may be used to identify and authenticate the customer. Once the authentication is done, the customer may select an item at the vending machine to purchase.

The vending machine may send a payment request to the payment service provider. The payment request may include the amount of the purchase for the selected item and the details of the identified customer. The payment service provider may authorize the payment transaction and may send a response back to the vending machine. If the payment transaction is successful, the vending machine may dispense the item selected by the customer. Thus, the customer is able to purchase an item from the vending machine without having to go through the authentication process, such as swiping a card or enter user ID and/or password at the vending machine.

Figure 4:
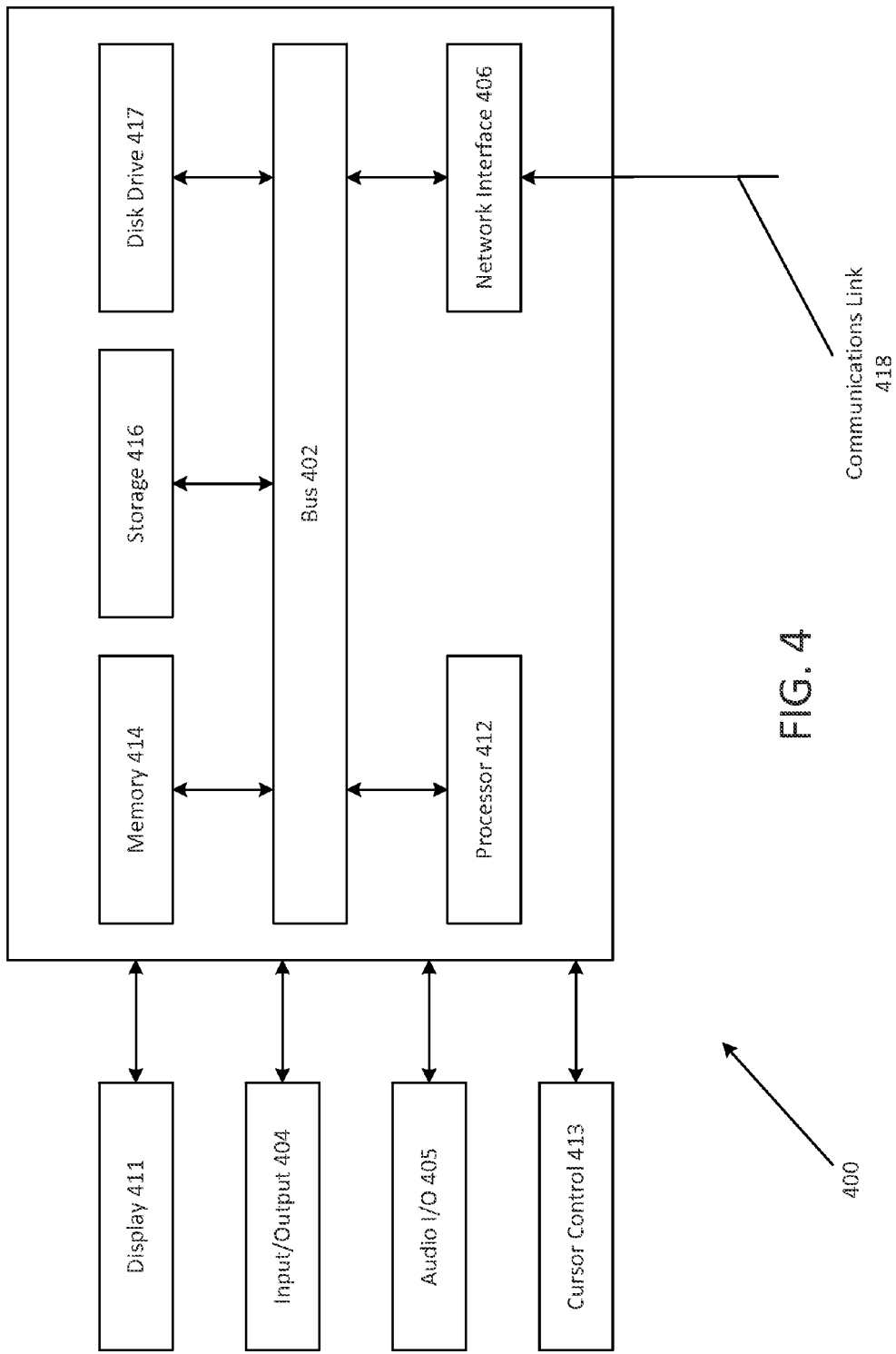
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, wearable device, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a microcontroller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer system comprising:
a wireless beacon associated with a physical location;
one or more server machines comprising one or more hardware processors couple to a non-transitory memory and configured to read instructions from the non-transitory memory to cause the computer system to perfom operations comprising:
providing, by the one or more server machines, a one-time use payment token to a user device associated with a user account permitted for automated authentication at the physical location, the user account being associated with a facial recognition profile of a user of the user device;
providing, by the one or more server machines, a digital signature and a one-time use token to the wireless beacon associated with the physical location;
detecting, by the wireless beacon, the user device when the user device is present at the physical location using Near Field Communication;
sending, by the wireless beacon, the digital signature and the one-time use token to the user device in response to the detecting, wherein the digital signature is used to verify the wireless beacon;
receiving, by the wireless beacon, an encrypted value sent from the user device wherein the encrypted value comprises the one-time use payment token of the user device and the one-time use token of the wireless beacon;
sending, by the wireless beacon, the encrypted value comprising the one-time use payment token of the user device and the one-time use token of the wireless beacon to the one or more server machines;
authenticating, by the one or more server machines, the user device and the wireless beacon based on the one-time use payment token of the use device and the one-time use token of the wireless beacon;
receiving, by the one or more server machines, an image of a human captured at the physical location;
comparing, by the one or more server machines, the image of the human captured at the physical location to the facial recognition profile of the user account associated with the authenticated user device;

automatically authenticating, by the one or more server machines without human involvement, the user account for a pending transaction at the physical location based on the comparing of the image of the human captured at the physical location to the facial recognition profile of the user account associated with the authenticated user device; and performing, by the one or more server machines, the pending transaction using the authenticated user account.

2. The computer system of claim 1, wherein the operations further comprise:

identifying the user account from among a plurality of user accounts associated with user devices authenticated at the physical location.

3. The computer system of claim 1, wherein the operations further comprise:

calculating a confidence score for each facial recognition profile of a plurality of user accounts associated with respective user devices authenticated at the physical location, each confidence score indicating a degree of similarity between the human in the image and a respective one of the facial recognition profiles; and determining that one of the respective facial recognition profiles matches the human in the image, at least in part, based on the confidence scores.

4. The computer system of claim 3, wherein the matching facial recognition profile has a highest confidence score among the confidence scores.

5. The computer system of claim 2, wherein the operations further comprise:

identifying one or more other user accounts associated with user devices authenticated at the physical location that are present in the image.

6. The computer system of claim 2, wherein the operations further comprise:

identifying the user account among the plurality user accounts associated with the user devices authenticated at the physical location based on a wireless signal strength of the user device in association with the wireless beacon.

7. The computer system of claim 6, wherein the identified user account has a greatest signal strength associated with the wireless beacon indicating that the user device is located most proximate to the physical location among one or more other user devices.

8. The computer system of claim 1, wherein the operations further comprise:

automatically completing the pending transaction without receiving identifying information for the user account.

9. The computer system of claim 1, Wherein the physical location is unmanned.

10. The computer system of claim 1, wherein a payment is automatically made from the user account associated with the pending transaction based on the automatic authenticating of the user account.

11. A machine-implemented method for automated authentication of a user at a physical location, comprising:

providing, by one or more server machines, a one-time use payment token to a user device associated with a user account permitted for automated authentication at a physical location, the user account being associated with a facial recognition profile of a user of the user device and the user account;

providing, by the one or more server machines, a digital signature and a one-time use token to a wireless beacon associated with the physical location;

detecting, by a wireless beacon, the user device when the user device is present at the physical location using Near Field Communication;

sending, by the wireless beacon, the digital signature and the one-time use token to the user device in response to the detecting, wherein the digital signature is used to verify the wireless beacon;

receiving, by the wireless beacon, an encrypted value sent from the user device wherein the encrypted value comprises the one-time use payment token of the user device and the one-time use token of the wireless beacon;

sending, by the wireless beacon, the encrypted value comprising the one-time use payment token of the user device and the one-time use token of the wireless beacon to the one or more server machines;

authenticating, by the one or more server machines, the user device and the wireless beacon based on the one-time use payment token of the user device and one-time use token of the wireless beacon;

receiving, by the one or more server machines, an image of a human captured at the physical location;

comparing, by the one or more server machines, the image of the human captured at the physical location to a facial profile of the user account associated with the authenticated user device;

automatically authenticating, by the one or more server machines without human involvement, the user account for a pending transaction at the physical location based on the comparing of the image of the human captured at the physical location to the facial profile of the user account associated with the authenticated user device; and performing, by the one or more server machines, the pending transaction using the authenticated user account.

12. The machine-implemented method of claim 11, further comprising:

collecting images of the user for building the facial recognition profile, of the user; and building the facial profile of the user based on analyzing the collected images.

13. The machine-implemented method of claim 12, wherein the images of the user are collected at least from two or more of a contact list of the user, a social network account, a digital photo album, or one or more images stored in association with the user device.

14. The machine-implemented method of claim 12, wherein the facial profile of the user comprises information indicating one or more unique facial features of the user.

15. The machine-implemented method of claim 12, wherein the facial profile of the user is updated periodically based on one or more newly collected images associated with the user.

16. A non-transitory machine-readable medium having stored thereon machine-readable instructions executable by a computer system to cause the computer system to perform operations comprising:

providing, by one or more server machines, a one-time use payment token to a user device associated with a user account permitted for automated authentication at a physical location, the user account being associated with a facial recognition profile of a user of the user device and the user account;

providing, by the one or more server machines, a digital signature and a one-time use token to a wireless beacon associated with the physical location;

detecting, by the wireless beacon, the user device when the user device enters the physical location using Near Field Communication;

sending, by the wireless beacon, the digital signature and the one-time use token to the user device in response to the detecting, wherein the digital signature is used to verify the wireless beacon;

receiving, by the wireless beacon, an encrypted value sent from the user device wherein the encrypted value comprises the one-time use payment token of the user device and the one-time use token of the wireless beacon;

sending, by the wireless beacon, the encrypted value comprising the one-time use payment token of the user device and the one-time use token of the wireless beacon to the one or more server machines;

authenticating, by the one or more server machines, the user device and the wireless beacon based on the one-time use payment token of the user device and the one-tirne use token of the wireless beacon;

receiving, by the one or more server machines, an image of a human captured at the physical location;

comparing, by the one or more server machines, the image of the human captured at the physical location to the facial profile of the user account associated with the authenticated user device;

automatically authenticating, by the one or more server machines without human involvement, the user account for a pending transaction at the physical location based on the comparing of image of the human captured at the physical location to the facial profile of the user account associated with the authenticated user device; and performing, by the one or more server machines, the pending transaction using the authenticated user account.

17. The non-transitory machine-readable medium of claim 16, wherein the physical location is unmanned and the automatic authenticating of the user account is performed, at least in part, based on detecting the user device at the physical location.

18. The non-transitory machine-readable medium of claim 16, wherein the automatic authenticating of the user account is further based on a detected wireless signal strength of the user device.

* * * * *